J. J. CARNEY.
AXLE LUBRICATING DEVICE.
APPLICATION FILED JULY 26, 1915.
1,287,880.
Patented Dec. 17, 1918.
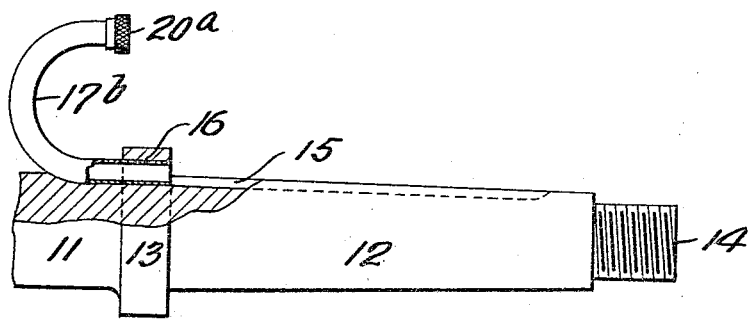
Witnesses
Inventor
J. J. Carney
By
Attorneys

UNITED STATES PATENT OFFICE.

JAMES J. CARNEY, OF BETHEL, VERMONT.

AXLE-LUBRICATING DEVICE.

1,287,880.   Specification of Letters Patent.   Patented Dec. 17, 1918.

Application filed July 26, 1915.   Serial No. 42,045.

*To all whom it may concern:*

Be it known that I, JAMES J. CARNEY, a citizen of the United States, and resident of Bethel, in the State of Vermont and United States of America, have invented certain new and useful Improvements in Axle-Lubricating Devices, of which the following is a full, clear, and exact description.

This invention relates to improvements in axle lubricating devices, and the object of the invention is to provide simple and efficient means for lubricating an axle without the necessity of removing the wheel or nut therefrom.

The device consists essentially of an axle having a groove formed in the bearing portion thereof and communicating with a tube passing through the shoulder at the inner end of the bearing portion, and connecting with any suitable means for introducing lubricant.

The drawing is a side elevation of an axle partly in section showing the invention applied thereto.

Referring more particularly to the drawings, 11 designates an axle having a bearing portion 12 separated from the main portion by a shoulder 13. At the opposite end of the bearing portion, the axle is reduced and threaded, as at 14, for engagement with a wheel retaining member. One or more grooves 15 are formed longitudinally in the bearing portion extending from the shoulder nearly to the threaded portion, and communicating with an aperture 16 formed through the shoulder. A U-shaped tube 17$^b$ is introduced through the aperture, so that both ends face the threaded portion 14. One end is secured in the aperture 16 and communicates with groove 15, while the other end may be closed by a cap 20$^a$. It will thus be seen that lubricant may be conveniently inserted by passing the nozzle of a grease gun or oil can between the spokes of the wheel, and inserting the same into the open end of the tube after the cap has been removed.

It will be obvious that a number of minor changes may be made in the arrangement of grooves and tube without departing from the spirit of the invention, which is essentially the introduction of lubricant from the shoulder or large end of the bearing portion into a distributing groove, without the necessity of removing either wheel or nut.

Having thus described my invention, what I claim is:—

1. In a device of the character described, the combination with an axle having a bearing portion provided at one end with a shoulder and at the opposite end with threads, said axle having a channel formed in said bearing portion extending from adjacent threads through the shoulder, of a U-shaped tube having one end longer than the other and the longer end inserted in the portion of said channel passing through the shoulder, said tube forming a reservoir for lubricant and closure means for the shorter end of the tube.

2. In a device of the character described, the combination with an axle having a bearing portion provided at one end with a shoulder, said axle having a channel formed in said bearing portion extending to the shoulder, a lubricant reservoir leading through the shoulder and communicating with the channel, said reservoir having its inlet and outlet in a vertical plane.

3. In a device of the class described, the combination with an axle having a bearing portion provided at one end with a shoulder, said axle having a channel formed in said bearing portion extending to the shoulder, a U-shaped tubular lubricant reservoir leading through the shoulder and communicating with the channel, the reservoir being in the vertical plane of the axle and having one end acting as an inlet and the other end acting as an outlet, both ends opening in the direction of the end of the axle so as to be readily accessible for filling, substantially as described.

In witness whereof, I have hereunto set my hand, in presence of two witnesses.

JAMES J. CARNEY.

Witnesses:
  GUY WILSON,
  PAUL F. WILSON.

Copies of this patent may be obtained for five cents each, by addressing the "Commissioner of Patents Washington, D. C."